March 29, 1938.  B. C. SKINNER  2,112,580
METHOD OF COLORING FRUITS
Original Filed April 19, 1930   3 Sheets-Sheet 1

March 29, 1938.  B. C. SKINNER  2,112,580
METHOD OF COLORING FRUITS
Original Filed April 19, 1930  3 Sheets—Sheet 2

Inventor
Bronson C. Skinner
By
Graham
Attorney

March 29, 1938.  B. C. SKINNER  2,112,580
METHOD OF COLORING FRUITS
Original Filed April 19, 1930  3 Sheets-Sheet 3

Inventor
Bronson C. Skinner
By
Graham
Attorney

Patented Mar. 29, 1938

2,112,580

UNITED STATES PATENT OFFICE 2,112,580

METHOD OF COLORING FRUITS

Bronson C. Skinner, Dunedin, Fla., assignor to Food Machinery Corporation, San Jose, Calif., a corporation of Delaware Original application April 19, 1930, Serial No. 445,775, now Patent No. 1,927,100, dated September 19, 1933. Divided and this application August 30, 1933, Serial No. 687,535

13 Claims. (Cl. 99—103)

This invention relates to a method for treating fruits of various kinds and especially refers to the coloring of all citrus fruits such as oranges, grapefruit, lemons, tangerines and many other fruits including bananas, that either normally have a green color or tend to turn green under certain temperature or climatic conditions, but which may be given a beautiful yellow or orange color through the controlled application of heat and moisture.

A number of reasons exist which make it necessary or desirable to color fruit by means of so called coloring rooms where the coloring is done by the application of heat and moisture in order to have the proper humidity.

In the first place the buying public are not inclined to buy fruit having a green colored skin where it is thought the normally ripe fruit should be a bright orange or yellow color.

Some citrus fruits, though mature and edible, may show a green coloring, which to the uninitiated seems to indicate that the fruit is not ripe, and usually such fruit will not normally change color except in contact with cold weather or by proper treatment in a coloring room.

Valencia oranges, for example, which are fully ripe and show an orange color, if held late in the season will tend to turn green and start growing when warm weather comes in the spring. With this variety especially, a treatment in the coloring room brings back the natural ripe yellow color to the fruit and greatly aids in the marketing of the product.

Many and diverse methods have been employed to effect these results through subjecting the product to heat in the presence of moisture and certain gases, but they have met with only partial success due principally to the difficulties encountered in maintaining a proper heat and moisture content throughout the entire room at all times while the process is in operation.

Fruit that is to be treated is packed in the commercial boxes and they are stacked four or five feet high in the rooms and usually almost fill the entire treating space, with of course such slight separation in stacking as to permit of proper circulation of the air throughout the pack.

Until recently a uniform temperature of about 85 degrees F., has given the best results, higher temperatures apparently tending to promote decay, which effects have been particularly noticeable when the heating is done by heat in the presence of certain gases.

During recent years the problem of sterilizing fruit for the destruction of any living organisms that might be in or on the fruit itself has made it necessary to increase the temperature to as much as 110 degrees F., in these rooms, in which case the uniform temperature throughout the room is more important than it has ever been. It has been found too that these higher temperatures require a correspondingly higher humidity.

The thing paramount in a system of this sort is to establish and maintain a uniform temperature and humidity in every part of the coloring room so that the fruit near the ceiling, that near the floor, that in the center of the pack and in the corners of the room receive substantially the same treatment as to time, temperature and humidity. If this is not accomplished then the treatment will not be uniformly successful. Some of the fruit will be over treated and some under treated with after results that will affect the marketing and sale of the product.

The method disclosed in this application will permit obtaining the uniform results necessary throughout the treating period, and by such uniformity the actual time of treatment has been cut considerably, which is an important feature of the invention.

Generally considered the invention includes a specially constructed room in which the fruit to be treated is packed in boxes and the boxes stacked in proper formation to permit the desired circulation.

This room is provided with a slatted floor and with the slats running in a diagonal direction so the boxes of stacked fruit will in no instance completely cover any of the slatted openings, assuming the boxes are always stacked parallel with the walls.

Two opposite sides of the room are provided with false walls providing a circulating space from the floor to the ceiling.

A blower system is placed over the room and connected therewith through openings near the ceiling and extending the entire length of the room, to provide the air for circulating through the room.

Steam pipes and an automatic control system are provided whereby live steam is admitted directly into the room, which steam element provides the necessary heat and humidity, no other heating or humidifying devices being necessary. The force of the entering steam also provides the means for circulating the air through the room, which combined with the air coming from the blower, produces and maintains the proper circulation to produce and maintain the desired heat and humidity.

The humidity is produced by the addition of moisture directly to the circulating air in the form of live steam; the room, therefore, is quickly heated uniformly over its entire area and the humidity quickly raised to the saturation point, and the condensation settling on the cold fruit, liberates its heat directly to the fruit so that it is not necessary to depend on heat by convection through the air. The automatic control of the steam inlet serves as a means of maintaining the desired temperature.

The blower system is normally intended to recirculate the air into the treating room, but means are provided whereby a measured amount of fresh air is added to the blower inlet to prevent smothering of the fruit.

This slight addition of fresh air added to the air from the room serves another important purpose. It creates a slight pressure in the room which most effectually prevents leakage of air into the room from the outside to affect the treating conditions. This slight pressure above atmospheric is just sufficient to cause a slight leakage out of the room through any cracks or crevices and thereby eliminates the development of cold spots or cold corners in the room which would occur if outside air gained admittance other than as provided for.

The admission of a small amount of outside air through the blower inlet, which is controlled by a suitable shutter, will not affect the temperature or humidity. This small amount of normal air contacting with the air in the room will immediately absorb moisture from the fruit, lowering the temperature slightly and thereby causing the automatic steam regulator to function, admitting more steam which will automatically increase the humidity just lost through absorption and thereby maintain the desired temperature and humidity.

When the coloring treatment has been completed it is sometimes desirable to immediately cool the fruit to normal temperature and in performing this cooling step some of the same apparatus is used for this purpose that was used in the heating and humidifying steps.

During the cooling operation the steam is of course shut off. The doors and openings to the room may be opened completely; the direction of the air jets from the blower system may be projected downward behind the false walls which will cause the air from the blower to pass downward behind the false walls at the sides of the room and up through the slatted floor into the stacked fruit, and by coming into contact with the fruit the heat will be absorbed therefrom and this heated air will rise and pass out of one of the openings provided for its escape. Other cold air will also enter the room through any doors or openings provided. The cool dry air circulating in and around the fruit will absorb the moisture therefrom and quickly cool and dry it.

There are numerous other advantages connected with the operation of this invention which will be more fully referred to and described as we proceed.

It is therefore a principal object of the invention to provide a method of heating fruit coloring rooms wherein steam is liberated directly into the room without coming into contact with the fruit until mixed with air.

It is also an object of the invention to provide an induced circulation in a fruit coloring room and for liberating live steam directly into the air current to thereby heat and humidify the air.

It is also an object of the invention to liberate live steam directly into air circulating into a fruit coloring room far enough in advance of the point at which the air contacts with the fruit to give the steam time to thoroughly heat and humidify and mix with the air so the fruit will not be scalded by contact with the hot steam.

It is a further object of the invention to provide a blower system for circulating air to a fruit coloring room with means for discharging steam directly into the suction side of the blower to thoroughly mix the air and steam before it contacts with the fruit.

It is also an object of the invention to provide a coloring room for coloring fruit by the application of heat and moisture wherein the floor of the room is of slatted construction with blower suction means for drawing air through said slatted floor and projecting it downward onto the fruit in said room.

It is a further object of the invention to provide a room for coloring citrus fruit wherein one or more sides of the walls are of false construction with an air space through which air may circulate for treating the fruit in the room.

It is a further object of the invention to provide a fruit coloring room wherein one or more false walls are provided with steam jets interposed in the spaces produced thereby to project steam in the direction the circulation is desired.

It is also an object of the invention to provide means for circulating air through a fruit coloring room wherein a blower system is provided with means for admitting a measured quantity of air to the inlet side of the blower from the outside thereby constantly adding fresh air to the quantity of air circulating in the room.

It is a further object of the invention to provide a circulating system for a fruit coloring room wherein a slight pressure above atmosphere may be maintained during the treating period.

It is also an object of the invention to provide a heating system for a fruit coloring room that will be automatically controlled through the varying temperature of the room.

It is also an object of the invention to provide a controlled system of heating fruit in a coloring room whereby the fruit is heated by condensation of water vapor on the fruit.

It is also an object of the invention to provide means in a fruit coloring room whereby the direction of the air circulating therethrough may be changed at will.

It is also an object of the invention to supply additional moisture to that supplied by the condensation of the heating steam by admitting water to the steam to prevent super-heat due to the orifice effect when high pressure steam is used.

Applicant has provided a set of drawings showing one way of applying his method to a coloring room and reference may now be had to the drawings where a clearer and better understanding of the invention may be had.

Figure 4:
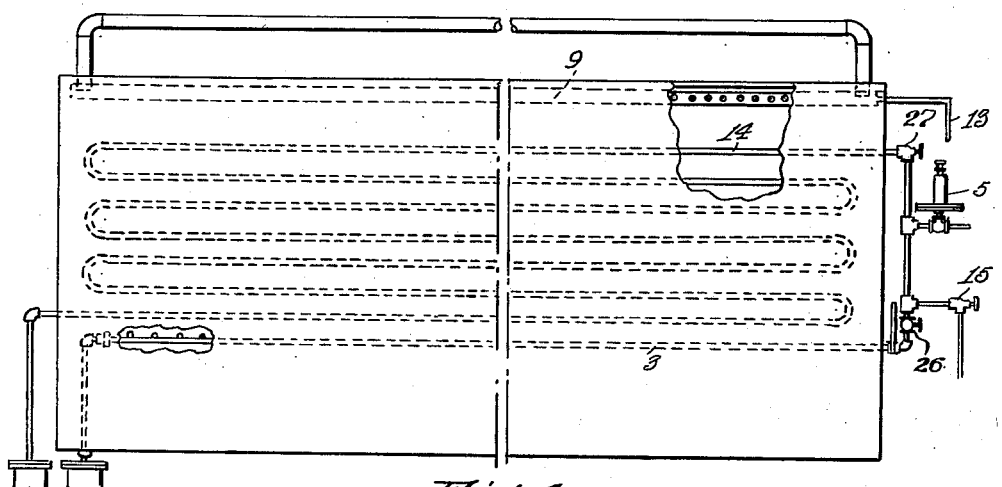

Figure 4 is a side elevation of a coloring room intended to show principally an additional piece of equipment for use in coloring rooms. This includes a heating coil to provide dry heat where desirable or to control the humidity provided by the open steam jets. The steam jets alone provide high humidity while the coils alone provide low humidity.

Figure 1:
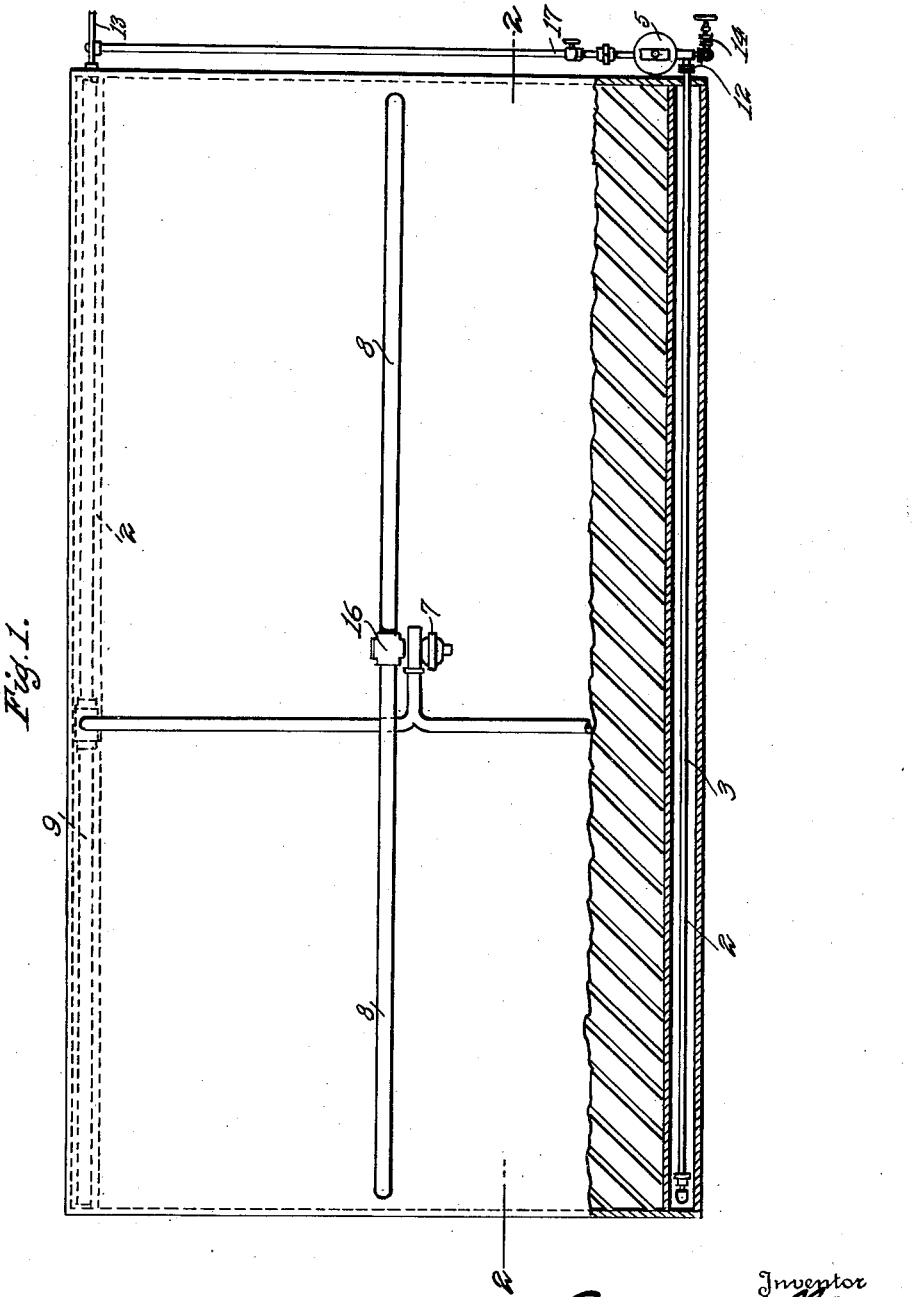
Figure 1 is a plan of a coloring room partly in section showing the blower system arranged on the top of the room; one of the false walls in the sectional part; the arrangement of the blower pipes and one of the steam lines back of the false partitions.
Figure 2:
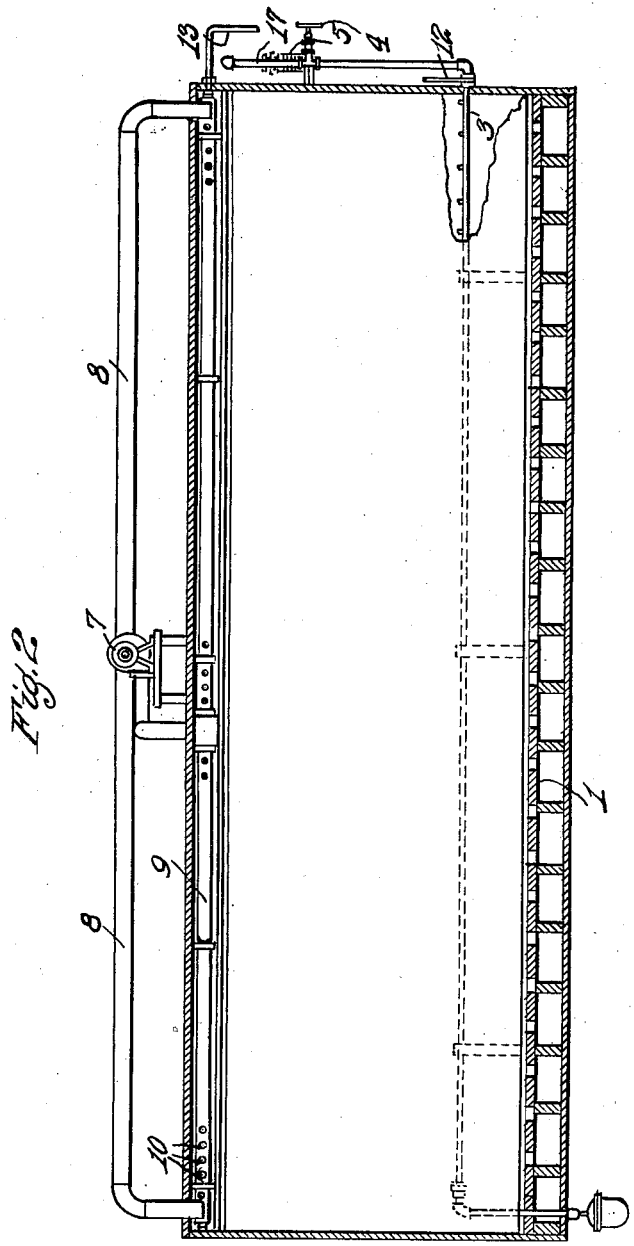
Figure 2 is a sectional elevation taken on approximately the lines 2—2 of Figure 1 and shows the slatted floor construction; the vertical placement of one of the steam lines; the arrangement of the air distributing pipes in the ceiling and the means for turning the steam and air pipes on their axes to change the direction of flow of the steam or air.
Figures 3, 5:
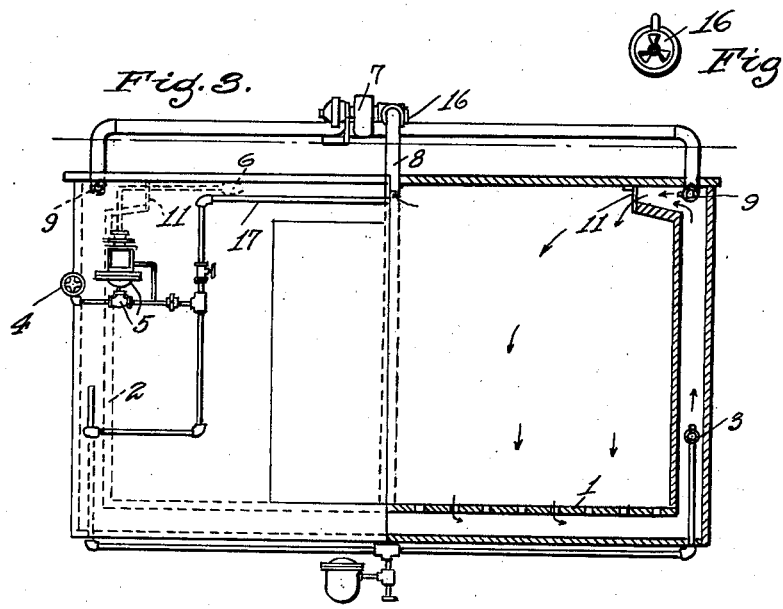
Figure 3 is an end elevation partly in section showing the location of the automatic steam control devices, the blower and pipes, the steam pipes back of the false partitions and other elements of the installation.

Figure 5 is a view of the shutter at the entrance port of the blower to show how the fresh air is admitted in graduated quantities as desired.

The general structure of a coloring room embodying this method would be substantially as follows: The floor 1 would be of slatted formation with the slats laid diagonally so that the boxes of fruit piled thereon parallel with the walls, will at no time completely cover any of the slatted openings. 2 represents the false partition, preferably on two opposite sides of the room, but in certain installations they may be provided on only one side of the room. Within the space between the wall proper and the false partition are located rotatable pipes 3 having jet openings for projecting steam jets either up or down the wall space according to the way they are turned.

The steam supply would come in through the valve 4 and pass into the heating system through the control valve 5. The valve 5 would be controlled by the sensitive bulb 6 located at the ceiling level where the air would be the hottest.

In the drawings I have shown the blower system located over the ceiling, but obviously this is not necessary but is a convenience as it shortens the pipe lines and makes a more direct application of the air supply to the circulation. 7 represents a blower of the usual type. The inlet pipe 8 is shown as drawing air from the ceiling for recirculating, but I have indicated by dotted lines on Figure 3 that the inlet or suction pipe can extend to the floor if desired. It should be mentioned that the suction of this blower is not heavy and is not sufficient to interfere with the proper circulation and falling of the cold air down through the slatted floor.

The outlet pipes from the blower 7 lead to the corner spaces of the chambers formed by the false partitions and the wall proper as at 9. These pipes have air jets 10 along their entire lengths, of which only a few are shown, and these air jets are pointed horizontally.

At the top of the chamber formed by the partition 2 and the wall there is a restricted opening 11, Figure 3, through which the air from the pipes 9 and the steam from the pipes 3 enter the room, a certain mixing taking place in this chamber before issuing through the opening 11.

As the mixed air and steam enters the room there is an immediate downward tendency imparted thereto by the falling cold air passing down through the slatted floor, this air is cooled of course by contact with the cold oranges or other fruit being treated.

The downward movement is illustrated by the arrows in Figure 3. The issue of steam through the jets in the pipes 3 will produce a circulation throughout the coloring room and produce considerable suction along the slatted floor.

The air jets 10 in the air pipes 9 being placed horizontally and directly toward the openings 11 will maintain the circulation through the false chamber even if the steam is completely cut off. The issue of steam is of course variable on account of the automatic control of heat. While the room is cool the issue will be near the maximum but when the room reaches proper temperature the automatic control valve 5 will act to restrict the flow and only enough steam will issue through the jets to maintain the desired temperature. The natural condensation accumulating in the steam lines is taken care of by the several steam and water traps shown.

When the room is operating as a coloring room the jets in the pipes 3 are pointed upward and the jets in the air pipes 9 are pointed horizontally toward the openings 11.

After the coloring operation is completed it is desired to cool the fruit, when the directions of these jets are changed, or during the coloring operation it may for some reason be desirable to change the direction of circulation. Such change of direction of the circulation is only necessary when it is desired to cool the fruit quickly. In order to change the direction of flow of the air currents the air pipes are turned axially to point the jets in the desired direction.

Both the steam and air pipes are mounted to permit of axial rotation through the medium of slip joints which are not specifically shown as they constitute ordinary well known construction, the actual turning is accomplished by the handles 12 and 13.

In Figure 4 is shown a means for providing a combination of dry and moist heat. The steam pipe 3 is located below the heating coils 14 so that some dry heat will be added to the heat of the issuing steam and the humidity may thereby be controlled. A control valve 27 controls the heat in the coils. The control valve 26 controls the heat from the steam pipes.

In operation when high humidity is desired valve 27 will be entirely closed and all of the heat supplied by the steam jets will give practically one hundred per cent humidity, except for the slight super-heat due to the orifice effect.

Provision is also made in this installation to provide added moisture to the steam to prevent super-heating when high pressure steam is used. 15 represents a water connection that will admit water to the steam pipe 3 and thereby supply the additional moisture desired.

The operation of a coloring system embodying my invention will be substantially as follows if the installation is as I have shown it in the accompanying drawings but may differ materially with a different arrangement and disposition of elements.

The fruit to be treated will be stacked in the room parallel with the walls and four or five feet high substantially completely filling the room, with a slight ceiling space to facilitate movement of the air currents over the top of the stacked boxes.

The room should now be closed tightly and the blower started with the air pipes 9 having the air jets 10 pointing toward the openings 11 so the air will be projected out over the top of the stacked fruit. By means of the hand valve 4 steam is now admitted to the pipes 3, these pipes having the jets pointed upward will project the steam into the air column generated by the issue of air from the pipes 9 and mixing therewith will heat the air as it issues through the openings 11 over the tops of the stacked boxes.

The strong suction produced by the issuing steam in the chamber back of the false partition will produce considerable suction under the slatted floor so that the cold air from the fruit will be pulled downward and circulated through this chamber remixing with new steam and being reheated thereby and recirculated through the boxes of stacked fruit.

When first opening the steam valve there will be a free flow of steam with a consequent strong suction under the floor.

As soon as the room begins to reach the desired temperature the automatic control valve will begin to function and the steam will be gradually shut off, and when the desired temperature is reached the steam will be practically entirely shut off, but with a properly operating and adjusted control there will always be a small issue of steam to keep up the desired temperature.

By mixing the issuing steam with the air it is heated and humidified, and since very little new air is added it does not take long for the air being circulated to reach the desired temperature and humidity.

The warm air circulating down through the fruit will give up its moisture by condensation on the fruit which heats the fruit quickly and directly with a heated element and greatly shortens the time necessary to treat a room full of fruit.

This direct heating through hot condensation is a very important feature of my invention. Through experimentation I have found that it requires about 8 hours, with dry air, to heat a single grapefruit so the center will have a temperature of 110 degrees F., with a normal temperature in the room of 112 degrees F., while with my improved method using a humidity of 100 per cent it only requires about 5 hours, assuming an initial temperature in each case of 80 degrees F. This reduction of treating time is due principally to the manner of liberating the heat of condensation directly onto the surfaces of the fruit.

Another important feature of operation that contributes largely to the success of my improved method is the maintaining of a slight pressure above atmospheric in the room.

A treating room that may be said to be tight is not necessarily air tight, and numerous cracks and crevices will admit more or less of outside air which would interfere more or less with proper circulation and would produce cold spots that may never be properly heated.

To obviate this I have provided means for admitting a small amount of outside air to the suction side of the blower.

This additional air will produce a slight pressure above atmospheric in the room and cause a constant leakage of air out of the room through the cracks and crevices that would otherwise let air into the room.

Through this means I am enabled to more quickly and uniformly heat the air being handled than if the outside air in varying quantities was constantly seeping into the room.

The air I do admit is measured accurately and since no other air can enter, the control is quite positive and regular.

This slight addition of outside air is admitted into the suction side of the blower by means of an ordinary shutter as at 16 Figure 5.

I have mentioned the addition of water to the steam to take care of super-heating. This is provided for through the valve 15 admitting water directly to the steam line.

I have also mentioned admitting steam directly to the suction side of the blower. This can be accomplished through the pipe line 17, which is best shown in Figure 3, the end of which terminates just at the suction opening of the blower at the side of the room. Steam through this pipe is controlled by a suitable valve as shown. The important point here is to have the steam uniformly distributed throughout the room.

In some instances it may be desirable to have the blower suction pipe extend to the floor to draw the cold air therefrom instead of drawing the more heated air from the ceiling. Either way will be entirely satisfactory.

If it is desired to treat the fruit at a sterilization temperature of 110 degrees F. the temperature controls would preferably be set at 112 degrees F. as a safety factor to insure at least 110 degrees of temperature. The heat control would be operated through the expansion and contraction of the sensitive bulb 6 located near the ceiling of the room.

When the coloring treatment has been completed, if it is desirable to immediately cool the fruit, the steam valves are entirely closed; the air pipes 9 are turned so the jets point downward, all the doors and openings into the room are opened, the blower is started and the shutter 16 preferably completely opened. The air jets pointing downward into the space between the partition 2 and the wall will produce a downward circulation and force the air up through the slatted floor causing it to rise up through the fruit, absorb the heat and be picked up by the suction of the blower, or escape through one of the openings into the room.

I mentioned in the forepart of this specification that certain gases had been used and were now being used in the presence of moisture to aid in the coloring process, with only partial success.

With my improved method gases of various kinds, such for example as, "ethylene", may be quite successfully used to aid in the coloring process, and under some conditions of operation and state of ripeness of the fruit being treated the coloring is accomplished in a much better and more satisfactory manner by the addition of a gas to the moisture laden air of the coloring room.

Any desired or suitable gas may be most easily distributed throughout the room by simply admitting it to the suction side of the blower, when it will be drawn into the room with the air and distributed in a perfect manner. The gas can also be admitted in any other desired manner.

It is to be understood that this improved method is amenable in a greatly varying degree in its adaptability to changing conditions, so that anyone versed in the art will be able to obtain almost any results desired in coloring methods applicable to citrus and other fruit.

This application is a division of an application filed by me under date of April 19, 1930 and bearing Ser. No. 445,775, now Patent 1,927,100, dated September 19, 1933.

It might just be casually mentioned that a well known law of nature comes into play in the practice of this improved method and assists somewhat in maintaining a constant recirculation without an excess pressure from the circulating blower system.

Whenever heated and highly humid air comes into contact with cold objects moisture is condensed onto the objects. When the heated and humid air circulating around the stored fruit comes into contact with the cold fruit, condensation immediately takes place thereby extracting moisture from the humid air and as result of this condensation a slightly reduced pressure is created around the fruit, and since cold air tends to drop and heated air tends to rise this area of reduced pressure around the fruit will induce the heated air from the top of the room to also drop downward to relieve the reduced pressure and thereby the constant circulation of the treating medium is facilitated, so that the combined suction of the live steam in the false wall and the slight suction caused by the condensation of moisture on the cold fruit maintains a constant circulation of the air through the room with only a slight pressure from the blower system. In fact, the blower simply blows the air into the room and the agencies above mentioned produce the circulation around the fruit.

What I claim as new and desire to secure by Letters Patent is:

1. A method of coloring citrus or other fruit through the application of humidified heated air consisting in bringing a volume of air and a volume of live steam into intimate contact to thereby heat and humidify the air and then flowing the air downwardly over the fruit whereby the moisture from the air will condense on the fruit and heat it thereby and adding additional steam and fresh air to maintain the medium in a highly humid condition.

2. The method of coloring citrus or other fruit consisting in placing a quantity of fruit in a substantially closed room, directing an air stream horizontally along the top of said room, directing a stream of live steam upward into said air stream to mix therewith, the upward direction of said steam causing a downward induced circulation through said room.

3. The method of coloring citrus or other fruit consisting in placing a quantity of fruit in a substantially closed room, directing a continuous stream of air across the top of said room, directing a stream of live steam into said air stream to mix therewith, the direction of movement of said steam inducing a downward circulation in said room.

4. The method of coloring citrus or other fruit consisting in placing a quantity of fruit into a substantially closed room, directing a continuous stream of air across the entire top area of said room, directing a stream of live steam into said air stream to mix therewith, the movement of said steam causing an induced downward circulation in said room and drawing the air from the top of said room to maintain the said constant stream.

5. The method of coloring citrus or other fruit consisting in placing a quantity of fruit into a substantially closed room, directing a continuous stream of air across the top of said room, directing a stream of live steam into said air stream to heat and humidify the same, drawing air from the top of said room to maintain the constant circulation and adding a small amount of fresh outside air to the air stream to produce a slight pressure above atmosphere in the room.

6. The method of coloring citrus or other fruit consisting in placing a quantity of fruit in a substantially closed room, directing a continuous stream of air across the entire top of said room, directing a continuous stream of live steam of varying intensity into said air stream to mix with, heat and humidify the same, the direction of flow of said steam stream acting to cause an induced downward circulation through said room.

7. The method of coloring citrus or other fruit consisting in placing a quantity of fruit in a substantially closed room, directing a stream of air over the top of the fruit, directing a stream of live steam into the air stream to heat and humidify the same, the direction of flow of the steam causing an induced downward circulation through said fruit, and drawing air from the bottom of said room to maintain the continuous circulation therethrough.

8. The method of treating and cooling stored fruit consisting in directing continuous streams of air mixed with live steam downwardly through the stored fruit for coloring the fruit by heat and moisture, then reversing the direction of the air stream and shutting off the steam to cause an upward circulation through the fruit to cool it.

9. The method of coloring citrus or other fruit consisting in placing a quantity of fruit in a substantially closed room, directing a continuous stream of air across the top of the room over the fruit, directing a continuous stream of steam and water mixed into said air stream to heat and humidify the same, the direction of flow of said stream of steam and water causing an induced downward circulation of heated and humidified air through and around said fruit, drawing air from said room and recirculating it with a small amount of fresh air and a continuous new stream of steam and water.

10. The method of coloring citrus or other fruit consisting in placing a quantity of fruit into a substantially closed room, recirculating a substantially fixed volume of air downwardly through said room, mixing variable quantities of live steam with said air to heat and humidify the same, extracting moisture and heat from said mixture through condensation on said fruit and replacing the extracted moisture by recontact with the live steam to maintain the recirculated air of uniform heat and humidity and continuously adding a measured quantity of fresh air to said mixture to maintain a slight pressure above atmosphere in said room.

11. The method of coloring citrus or other fruit consisting in placing a quantity of fruit into a substantially closed room, recirculating a substantially fixed volume of air downwardly through said room, mixing variable quantities of live steam with said air to heat and humidify the same, the contact of said mixture with the fruit causing moisture to condense on the fruit and produce an area of reduced pressure therearound which in turn induces a downward circulation through said room, recontacting said stream of air with said live steam to replace the extracted moisture and thereby maintain the mixture constant and continuously adding a measured quantity of fresh air to said mixture to maintain a slight pressure above atmosphere in said room.

12. A method of treating fruit to color or ripen the same, comprising the steps of placing the fruit in a treating room having an open floor and a circulating space below said floor, introducing heated and highly humidified air into the top of said room and circulating it downwardly through the room and into the space therebelow, the air contacting with the fruit during its downward passage whereby moisture condenses and accumulates on the fruit from the circulating air and is treated thereby, drawing the air from the space below said floor and reintroducing it into the top of the room for recirculation therethrough.

13. Same as claim 12 with this addition: and introducing live steam and fresh air into the circulating treating air after it has passed through said floor and before it is reintroduced into the top of the treating room.

BRONSON C. SKINNER.